Y. BAILY.
Self Generating Gas Burner.
No. 708.
Reissued May 3, 1859.
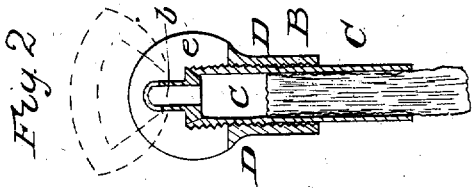
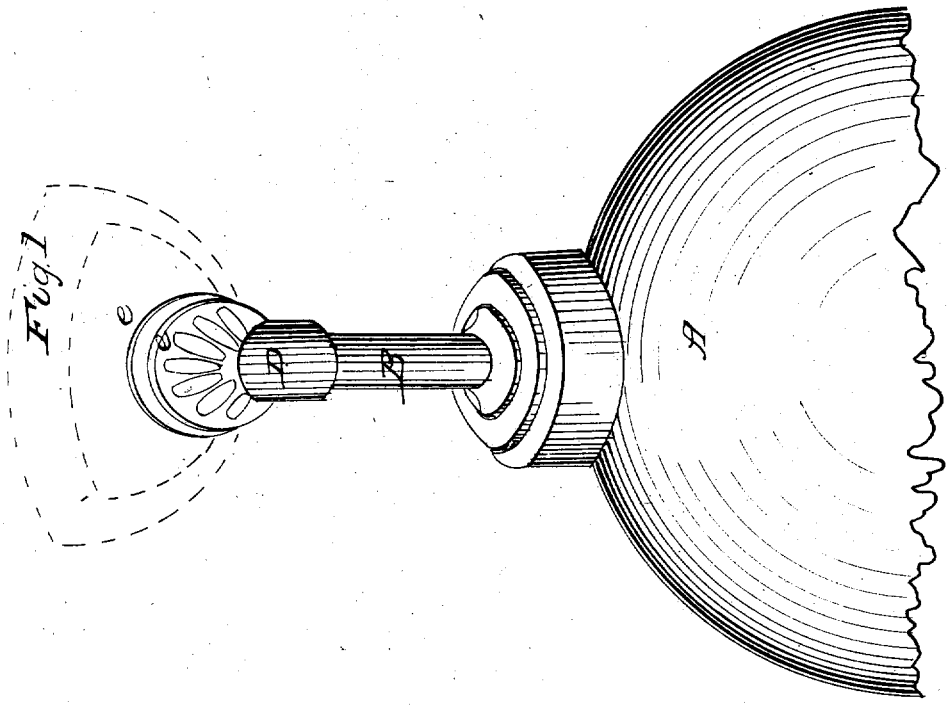
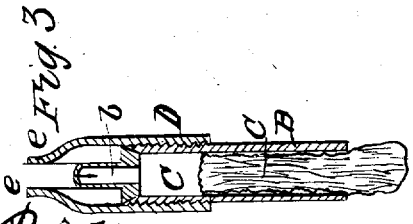
WITNESSES
J. L. Brown
R. F. Osgood.
INVENTOR
Y. Baily.
N. PETERS. Photo-Lithographer. Washington, D. C.

UNITED STATES PATENT OFFICE.

JOHN K. ONEIL, OF KINGSTON, NEW-YORK, ASSIGNEE OF YARNALL BAILY.

IMPROVEMENT IN GAS-BURNERS.

Specification forming part of Letters Patent No. 21,733, dated October 12, 1858; Reissue No. 708, dated May 3, 1859.

*To all whom it may concern:*

Be it known that YARNALL BAILY, of the city and county of Philadelphia, in the State of Pennsylvania, has invented a new and Improved Self-Generating Gas-Burner; and I, JOHN K. ONEIL, of Kingston, in the county of Ulster and State of New York, assignee of all the right and title in and to said invention, do hereby declare that the following is a full and exact description thereof, reference being had to the accompanying drawings, making part of this specification.

Figure 1 is a view in perspective of said burner, showing it adjusted for producing a full light; Fig. 2, a vertical section thereof, showing it adjusted for producing a diminished light; Fig. 3, a vertical section in a plane at right angles to the plane of the section in Fig. 2.

Like letters designate corresponding parts in all the figures.

From a lamp or reservoir, A, Fig. 1, a tube, B, or its equivalent extends upward for receiving the wick C and burner *b*. The upper part of the tube B immediately beneath the burner *b* may be unoccupied by the wick C, in order to furnish a small space or chamber, C, to contain a quantity of generated gas, so that a ready supply thereof may always be secured. To the upper end and outside of the tube B is secured the heater D, in which my invention consists, and which is constructed and arranged substantially as follows:

The lower part of said heater is either of tubular form or of any other practicable construction by which it may be placed in contact with the wick tube or holder B and be adjusted up and down or toward and from the flame. It is provided with one, two, or any other number of flanges or heat-receivers, *e e*, which extend up from the lower or attaching part by the side of the flame of the burner *b*. These flanges or heat-receivers are of the form represented, or of any other form, shape, or construction, such as of curved wire or band, balls, disks, or open-work, provided the purpose of receiving the heat from the flame and communicating it downward to the wick tube or holder is effected thereby. The means or mode of adjusting the heater up and down may be by a screw-thread cut therein and working over a screw-thread on the wick-tube, as represented in the drawings, or in any other way which may be convenient or desired, and the different heaters *e e* may be permanently attached to or constructed with the lower or attaching part or with each other, and thus be all adjusted together, or each adjustable separately by sliding or turning up and down or to and from the flame in any suitable way. The action of this adjustable heater is such that when its heat-receivers *e e* are raised by the side of the flame or brought nearer thereto, and thus more surface exposed to the heat thereof or subjected to a greater intensity by nearer proximity thereto, more heat is communicated by said heater to the fluid brought up into the tube or wick-holder B by the wick C, and consequently more gas generated and a larger flame produced, as indicated in Fig. 1; but when the heat-receivers *e e* are lowered or moved away from the flame, thus exposing less surface thereto or receiving less intensity of action therefrom, by consequence less gas is generated below and a smaller flame is produced, as indicated in Fig. 2. Thus, by adjusting the heater or its heat-receivers to different positions more or less gas is generated at pleasure to any desirable limit, and the quantity or size of flame produced is correspondingly varied.

I do not claim the employment of heaters or their equivalents for carrying heat from the flame of lamps to the oil or vaporizing-fluid thereof for the purpose of generating the gas therefrom; but

What I claim as the aforesaid invention is—

Producing a light, which may be increased or diminished at pleasure, by means of the adjustable heater D or heat-receivers *e e*, operating in connection with a wick tube or holder, B, and the flame of the lamp or burner, substantially as herein specified, or within the meaning and intention thereof.

The above specification signed by me this 26th day of March, 1859.

JOHN K. ONEIL.

Witnesses:

J. S. BROWN,
Y. BAILY,
EDM. F. BROWN.